United States Patent [19]

Silas

[11] Patent Number: 4,856,998

[45] Date of Patent: Aug. 15, 1989

[54] TEACHING AIDS

[76] Inventor: Letha Silas, 6595 Peppermill La., College Park, Ga. 30349

[21] Appl. No.: 161,773

[22] Filed: Feb. 29, 1988

[51] Int. Cl.⁴ .............................................. G09B 19/02
[52] U.S. Cl. ..................................... 434/210; 434/199
[58] Field of Search ........................ 434/191, 199, 210

[56] References Cited

U.S. PATENT DOCUMENTS

| | | | |
|---|---|---|---|
| 43,545 | 7/1864 | Bugbee | 434/191 |
| 236,320 | 1/1881 | Ginn | 434/191 |
| 1,169,510 | 1/1916 | Rickard | 434/199 |
| 1,728,491 | 9/1929 | Janneson | 434/199 |
| 2,457,332 | 12/1948 | Wade et al. | 434/203 |
| 2,527,080 | 10/1950 | Rickard et al. | 434/203 |
| 2,804,699 | 9/1957 | Robinson | 434/210 X |
| 3,013,348 | 12/1961 | Casteel | 434/429 |
| 3,514,873 | 6/1970 | Stobbe | 434/190 |
| 3,716,935 | 2/1973 | Friederichs | 273/239 X |
| 4,176,474 | 12/1979 | O'Sullivan | 434/210 |
| 4,178,700 | 12/1979 | Dickey | 434/428 |
| 4,204,341 | 5/1980 | Nowak | 434/430 X |
| 4,295,832 | 10/1981 | Karell | 434/190 x |

FOREIGN PATENT DOCUMENTS 847080 8/1952 Fed. Rep. of Germany ...... 434/191

*Primary Examiner*—William H. Grieb
*Attorney, Agent, or Firm*—Dominik, Stein, Saccoccio, Reese, Colitz & Van Der Wall

[57] ABSTRACT

An improved teaching aid including a plurality of parts, each of the parts having arithmetic indicia printed thereon, the parts being operatively coupled and relatively moveable with respect to each other to vary the location of the arithmetic indicia of one part with respect to the arithmetic indicia of the other part for presenting a student with different preselected arithmetic indicia representing different arithmetic problems to be solved.

13 Claims, 5 Drawing Sheets

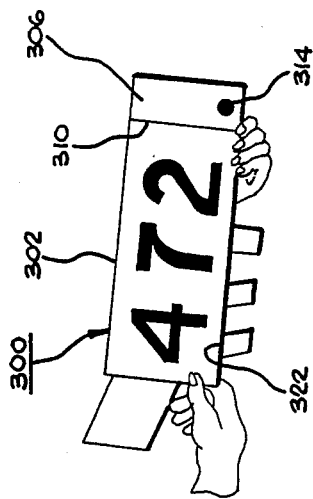
FIG. 9
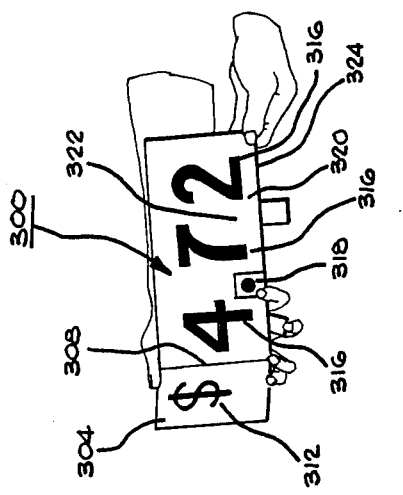
FIG. 8
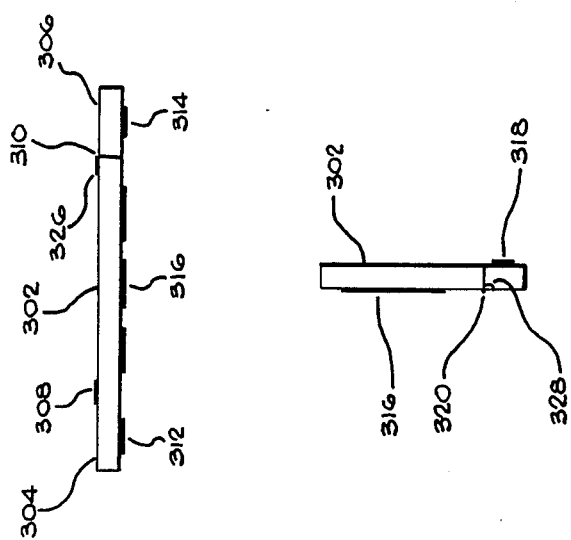
FIG. 10
FIG. 11

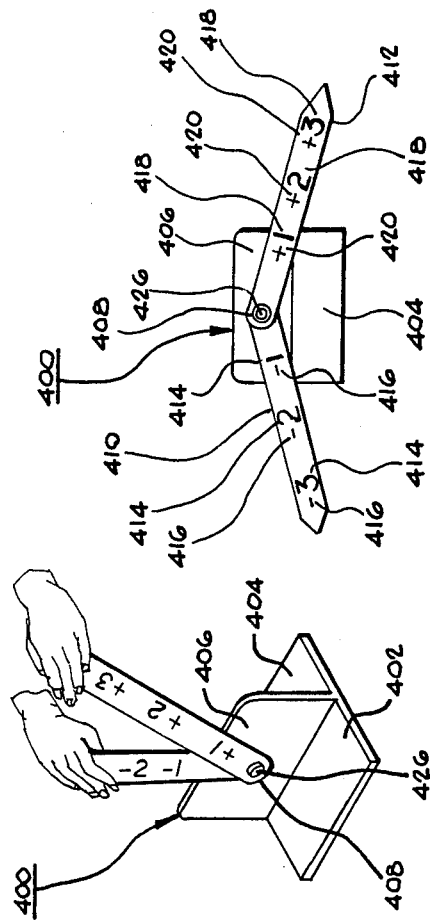
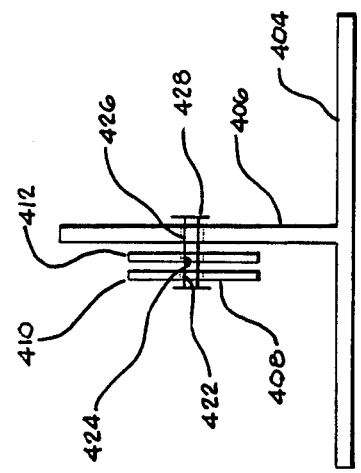
FIG. 12
FIG. 13
FIG. 14

TEACHING AIDS

BACKGROUND OF THE INVENTION

This invention relates to teaching aids and, more particularly, to teachings aids comprised of parts relatively movable with respect to each other and with arithmetic indicia on each of the parts to assist in teaching arithmetic through the physical representation of mathematical concepts.

DESCRIPTION OF THE BACKGROUND ART

In the teaching of academic subjects to students, teachers will frequently utilize visual teaching aids in an effort to facilitate the comprehension of certain concepts by the students. Use of physical visual aids is particularly useful in teaching subjects such as mathematics. This is because mathematics is very conceptual.

The physical representation of mathematical concepts has been long recognized as a preferred technique to facilitate the learning process. For example, the concept of $2+3=5$ is often taught by bringing two apples into proximity with an additional three apples so that the student can view and comprehend that five is the sum of three and two. Beyond this simplest example of the physical representations of mathematical concepts, teachers have made significant advances in physical visual teaching aids to facilitate the learning of a wide variety of other subjects.

A wide variety of approaches are disclosed in the literature to improve the efficiency of learning. By way of example, note U.S. Pat. No. 1,169,510 to Rickard. According to that disclosure, a supporting frame is provided with transparent pockets in which may be positioned strips with numerals in any one of a plurality of arrays. The student may attempt to perform mathematical computations such as addition on the numbers of any array of numbers.

In another type of learning aid, that disclosed in U.S. Pat. No. 1,728,491 to Janneson, an elongated rod with sequential numerals is employed. Slidable separators are positioned on the rod. The groups of separators are slidably positioned with respect to the numerals to facilitate the counting by two's, five's, etc., such as 2, 4, 6, 8, or, in the alternative, 5, 10, 15, 20, etc. The separators may also be utilized to teach addition as being the sum of the numbers on opposite sides of the separators.

In Stobbe, U.S. Pat. No. 3,514,873, numbers and mathematical symbols are provided with magnetic backing for removable attachment with respect to a magnetic board. In this manner the numbers and symbols can be positioned and repositioned for representing various mathematical problems to be solved. Magnetic devices are also disclosed in U.S. Pat. No. 3,716,935 to Friederichs.

Other types of educational devices involving physical visual aids include the ancient abacus. Improvements in abacuses are disclosed in U. S. Pat. No. 2,457,332 to Wade et al and in U.S. Pat. No. 2,527,080 to Rickard et al.

The use of physical visual devices for educational purposes are not, however, limited to use in teaching mathematics. U.S. Pat. No. 3,013,348 to Casteel and U.S. Pat. No. 4,295,832 to Karell disclose the manipulation of letters and words for use by teachers in assisting students to learn subjects other than mathematics. In addition, U.S. Pat. No. 4,178,700 to Dickey discloses devices for graphical representations in the field of story boards and charts or maps or the like.

Physical devices are also found to have utility for speech impaired persons who may wish to utilize physical aids for spelling out messages face-to-face with another person through pointing to the proper sequence of squares provided with letters or numbers. Note U.S. Pat. No. 4,204,341 to Nowak.

Although many such advances are noteworthy to one extent or another, none achieves the objectives of an efficient, reliable, inexpensive, convenient to use teaching aid designed to accommodate the needs of a wide variety of students.

As illustrated by the great number of prior patents as well as commercial devices, efforts are continuously being made in an attempt to improve teaching aids to render them more efficient, reliable, inexpensive and convenient to use. None of these previous efforts, however, provides the benefits attendant with the present invention. Additionally, prior teaching aids do not suggest the present inventive combination of component elements arranged and configured as disclosed and claimed herein. The present invention achieves its intended purposes, objects and advantages over the prior art devices through a new, useful and unobvious combination of component elements, with the use of a minimum number of functioning parts, at a reasonable cost to manufacture, and by employing only readily available materials.

It is, therefore, an object of this invention to provide an improved teaching aid comprising a plurality of parts, each of the parts having arithmetic indicia printed thereon, the parts being operatively coupled and relatively moveable with respect to each other to vary the location of the arithmetic indicia of one part with respect to the arithmetic indicia of the other part. This presents a student with different preselected arithmetic indicia representing different arithmetic problems to be solved.

It is another object of this invention to efficiently represent mathematical concepts with teaching aids.

It is a further object of this invention to assist teachers and students through the utilization of physical aids with indicia on fixed and movable parts in the representation of mathematical concepts.

Lastly, it is an object of the present invention for teachers to manipulate visual aids in teaching students arithmetic.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiments shown in the attached drawings. For the purpose of summarizing the invention, the invention may be incorporated into an improved teaching aid formed of a plurality of parts, each of the parts having arithmetic indicia printed thereon, the parts being operatively coupled and relatively moveable with respect to each other to vary the location of the arithmetic indicia of one part with respect to the arithmetic indicia of the other part for presenting a student with different preselected arithmetic indicia representing different arithmetic problems to be solved.

The invention may also be incorporated into an improved learning aid for use by a student in comprehending mathematical concepts comprising a strip of material with a plurality of numerals printed thereon receivable in the channel whereby the strip of material may be moved from one end of the opaque member to the other to demonstrate one of a plurality of whole numbers or to demonstrate one of a plurality of decimals as a function of the side of the opaque member read by the student and the position of the strip with respect to the opaque member; and an opaque member formed to provide a channel and with the word "DECIMALS" and a first decimal point on one side and with the words "WHOLE NUMBERS" and a second decimal point on the other side. A handle extends downwardly from one lower edge of the opaque member. The first decimal point is located near the lower right hand corner on the one side and the second decimal point is located near the lower left hand corner of the other side.

Additionally, the invention may be incorporated into an improved teaching aid comprising a transparent member formed of two parallel plates coupled together adjacent to their upper and lower edges to define a channel therebetween; a strip having a plurality of numerals formed thereon, the strip being receivable in the channel; and a decimal point formed on a front lower portion of one of the plates whereby the strip may be moved one way or the other within the channel to demonstrate certain different whole or decimal numbers as a function of the location of the strip within the channel. The parallel plates are coupled together by small plastic spacer strips extending horizontally along the upper and lower edges of the parallel plates. An opaque rod with a loop in the upper end is suspendable from the upper edge of the transparent member between preselected numerals of the strip for assisting in the teaching of rounding off of decimals or whole numbers.

Also, the invention may also be incorporated into improved teaching aids for use by teachers in the teaching of mathematics comprising a large main plate having numerals thereon; medium side plates independently pivotable about adjacent vertical edges of the main and side plates to bring either a dollar sign or a decimal point on the side plates into view with the indicia of the main plate; and small bottom plates with decimal points independently pivotable about adjacent horizontal edges of the main and bottom plates to selectively bring the decimal points of the bottom plates into view with the indicia of the main plate. The device comprises only plates which are opaque.

Further, the invention may also be incorporated into an improved device for use in teaching arithmetic to a student comprising a pedestal formed of a rigid material shaped with a horizontal base portion and a vertical upstanding portion with the numeral "0" printed centrally with respect to the upstanding portion; two independently pivotable arms extending outwardly from the upstanding portion; negative numerals sequentially printed on one arm locatable to the left of the numeral "0"; positive numerals sequentially printed on the other arm locatable to the right of the numeral "0"; apertures extending through the arms and through the pedestal; and a pin positionable through the arms and pedestal whereby the arms may be extended outwardly or upwardly with preselected numerals on the arms being covered to illustrate certain conceptual principles of addition and subtraction. The pedestal and arms are formed in an inverted "T"-shaped configuration.

Lastly, the invention may also be incorporated into improved teaching aids comprising a transparent member with a plurality of zones laterally located side by side; letters written in each zone representing units of measurement, the letters written in the three left zones including "K" and "H" and "D" indicative of the prefixes Kilo (1,000) and Hecta (100) and Deca (10), the letters written in the three right zones including "d" and "c" and "m" indicative of the prefixes deci (1/10) and centi (1/100) and mili (1/1000); and a strip with a written numeral followed by a series of zeros selectively positionable beneath the letters of the zones for teaching the relationship between numbers and units including parts and multiples thereof. The teaching aid has spacing between the zone of the transparent member being equal to the spacing between the numeral and zeroes of the strip and includes a central zone between the three left zones and three right zones of the transparent member.

The foregoing has outlined rather broadly some of the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purpose of the present invention. It should also be realized by those skilled in the art that such equivalent construction does not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 8 is a perspective illustration of a teaching aid constructed in accordance with a third embodiment of the present invention.

FIG. 9 is a perspective illustration of the aid shown in FIG. 8 but in a different orientation.

FIG. 10 is a sectional view taken horizontally through the center of the aid shown in FIGS. 8 and 9.

FIG. 11 is a sectional view taken vertically through the teaching aid shown in FIGS. 8 and 9.

FIG. 12 is a perspective illustration of a fourth embodiment of a teaching aid constructed in accordance with the principles of the present invention.

FIG. 13 is a perspective illustration of the teaching aid shown in FIG. 12 but showing an alternate orientation.

FIG. 14 is a sectional view of the teaching aid shown in FIGS. 12 and 13.

Similar referenced characters for each embodiment refer to similar parts throughout the several views of the particular embodiment.

DETAILED DESCRIPTION OF THE INVENTION

Figure 1:
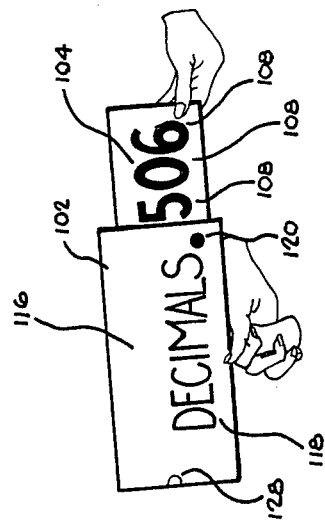
FIG. 1 is a perspective illustration of a first embodiment of a teaching aid constructed in accordance with the principles of the present invention.

With reference to FIGS. 1, 2, 3 and 4, there is shown a system 100 formed of an opaque plastic member 102 and a strip of opaque material 104. The plastic member 102 is folded in a closed loop configuration to form a channel 106 for the receipt of the strip 104 of material such as paper, cardboard, plastic or the like. Numerals 108 are formed thereon as through printing, writing, painting, paste-ons, etc. A handle 110 depends downwardly from the central portion of one lower horizontal edge 112. The other edge 114 is up turned to form the channel.

Figure 2:
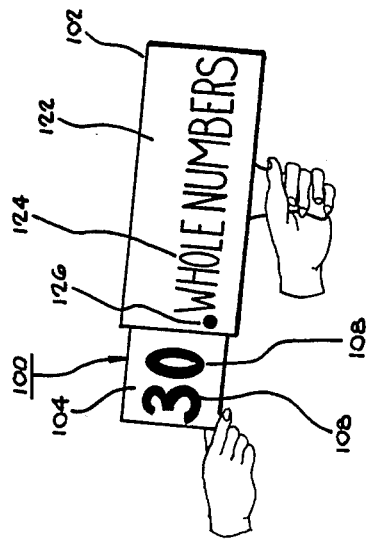
FIG. 2 is a perspective illustration of the reverse side of the teaching aid as shown in FIG. 1.

On one side 116 of the plastic member is written the word "DECIMALS" 118 with a decimal point 120 formed at the lower right hand corner. On the other side 122 is written "WHOLE NUMBERS" 124 with a decimal point 126 formed at the lower left hand corner. The strip 104 may be moved from one side to the other for demonstrating whole numbers, such as 30 as shown in FIG. 2. More or less digits might be positioned to the left of the decimal through the sliding of the strip out of the plastic member. Further, other strips could be utilized for generating randomness in the numbers to be read by the student. In addition, cut out areas 128 may be formed at the edges of the plastic member 102 to facilitate the gripping and moving of the strip 104.

When the plastic member is turned so that the other side faces the student, the word "DECIMALS" may be seen. The numerals on the strip may thus demonstrate the concept of decimals. Shown in FIG. 1 is 0.506. The number 0.506 is made up of the whole number which includes the digits 5 and 0 and 6 on the strip and the decimal point from the opaque plastic member. Together they make up 0.506 or 506/1,000 to be read by the student. If the teacher were to push the strip into the opaque member one digit, 0.06 or 6/100 would be presented to the student for reading. Conversely, if the teacher were to pull out the strip to expose an additional digit, such as 2, the number 0.2506 or 2,506/10,000 would be presented to the student for reading.

Figure 3:
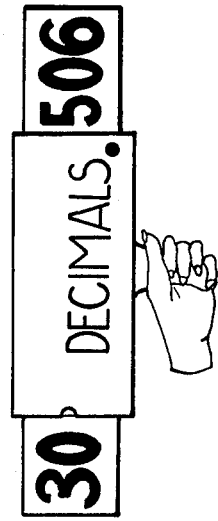
FIG. 3 is a perspective illustration of the front side of the teaching aid as shown in FIG. 1 but with two slidable cards being utilized.
Figure 4:
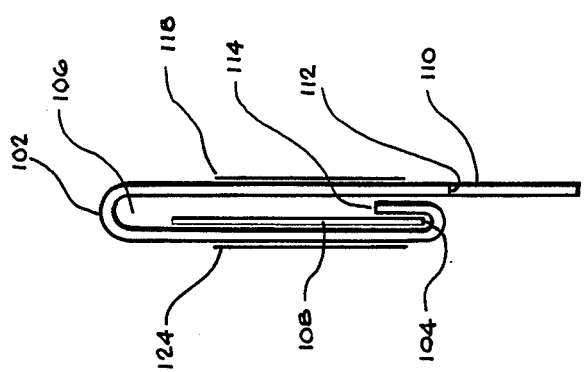
FIG. 4 is a sectional view of the teaching aid shown in FIGS. 1 and 2.

Shown in FIG. 3 is a variation in use where two strips 104 are utilized in the same slot with the decimal numerals 506 being pulled from the right side and with the whole numerals 30 being pulled from the left side. In this manner the student would be required to read a mixed number 30 and 560/1,000.

The numerals on the strip of paper are arithmetic indicia. The decimal point and the words on opposite sides of the opaque member may also be considered arithmetic indicia. When the two parts of the system 100, the strip 104 and the plastic member 102, are moved with respect to each other, different mathematical problems are presented to a viewing student for being solved.

Figure 6:
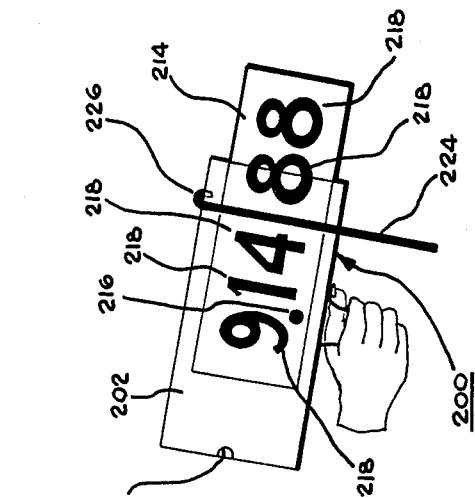
FIG. 6 is a view of the teaching aid shown in FIG. 5 but in a different orientation.
Figure 5:
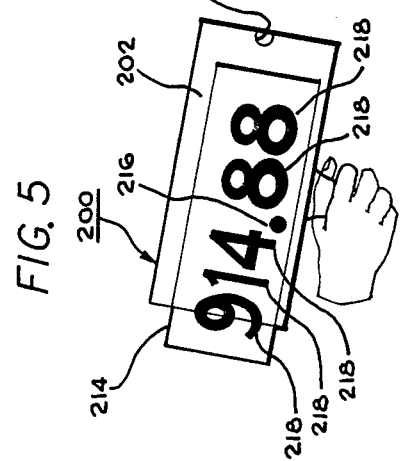
FIG. 5 is a perspective illustration of a second embodiment of a teaching aid constructed in accordance with the principles of the present invention.
Figure 7:
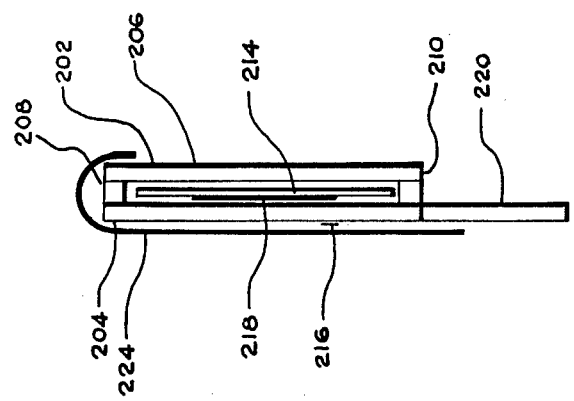
FIG. 7 is a sectional view of the teaching aid shown in FIGS. 5 and 6.

In another embodiment, that shown in FIGS. 5, 6, and 7, there is a system 200 including a transparent plastic member 202 formed of two transparent plates 204 and 206. Small plastic spacer strips 208 and 210 extend horizontally along the lengths of the transparent plates adjacent their upper and lower edges to define a channel 212 for the receipt of the number strip 214. A decimal point 216 is located adjacent to the lower edge of the front portion of one of the plates, preferably centrally located, so that the sheet material may be repositioned within the channel one way or another to demonstrate certain preselected whole, or mixed decimal numbers to be identified by a viewing student.

Shown in FIG. 5 is the number 914.88 made up of the whole number 914 and the part number 88/100. The number is made up of numerals 218 from the sliding strip 214 and a decimal point 216 fixed to the transparent plate 202. If the teacher were to slide the strip 214 one place to the right, the number 91.488 made of of 91 and 488/1,000 would be presented for reading by the student. As in the prior embodiment, a handle 220 extends downwardly from the lower edge of one of the plates while cut out areas 222 are formed at the side edges of one or more of the plates.

A candy-cane-like black opaque rod 224 may be suspended by a bend 226 in its top from the top edge of the plastic member between numerals of the strip 214 for assisting in the teaching of rounding off of either decimals or whole numbers. Shown in FIG. 6 is the rod placed after the four. In this case the student could round the number to two places after the decimal point, or to 9.15, 9 and 15/100. Should the teacher reposition the rod one digit to the left, the student could round the number to one place after the decimal, 9.1 or nine and 1/10.

A third embodiment of the invention is shown in FIGS. 8, 9, 10 and 11. This embodiment includes a system 300 which employs a stiff opaque plastic main plate 302 with medium side plates 304 and 306 either or both of which may be moved by pivoting about the vertical side edges 308 and 310 of the main 302 and side 304 and 306 plates to bring either a dollar sign 312 or a decimal point 314 on the side plates into view with the numerals 316 of the main plate. One, both or neither of the side plates may be pivoted into position for viewing by a student. Additional decimal points 318 on small bottom plates 320 are independently pivotable into various positions with respect to the numerals of the main plate to change the value of the number being viewed and identified by the student. The small bottom plates are pivotable at their upper horizontal edges 322 with the lower horizontal edge 324 of the main plate 302.

Flexible adhesive tape 326 and 328 may be used to couple the main plate to the side plates and to the bottom plates to effect the desired pivoting. For example, should the decimal point in FIG. 9 be moved away and the central bottom plate be pivoted upward, the numerical value could be changed from 472. to 4.72, i.e., 4 and 72/100. The manipulation of the dollar sign 312 and various decimal points 314 and 318 can easily allow the value of the numerals 316 on the main plate to be changed for student identification.

FIGS. 12, 13 and 14 show yet another embodiment of the invention. This embodiment employs a system 400 which includes a stiff plastic pedestal 402 formed of opaque plastic formed with a horizontal base portion 404 and an upstanding portion 406 in an inverted "T" when viewed from a side. Note FIG. 14. A "0" 408 is printed centrally with respect to the upstanding portion. Two pivotal arms 410 and 412 extend outwardly and are positionable in opposite directions. Negative numerals 414, numbers with a "−" sign 416, are printed on the left arm 410, to the left of the central "0" 408. Positive numerals 418, numbers with a "+" sign 420, are printed on the right arm 412, to the right of the central "0" 408. Apertures 422, 424 and 426 extend through the arms 410 and 412 and through the upstanding portion 406 of the pedestal and receive a pin 428 for supporting the arms 410 and 412 with respect to the upstanding portion 406 and for allowing relative rotational movement therebetween.

With this construction the central "0" 408 is located on the exterior arm 412 at the pin 428. In operation and use, the arms may be extended upwardly pivoting around the pin 428 and the central "0" 408 with the numerals selectively covered by a teacher to illustrate certain conceptual aspects of addition and subtraction. As shown in FIG. 12, the fact that it takes five integers to get from negative two to positive three could easily illustrate the equation $2+3=5$ or that the difference between 3 and 2 is 1.

Figure 16:
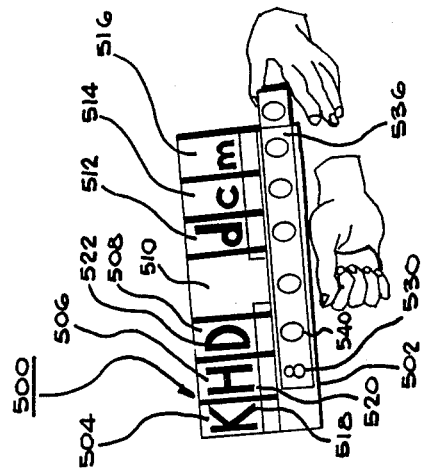
FIG. 16 is a perspective illustration of the teaching aid shown in FIG. 15 but showing the aid in a different orientation.
Figure 15:
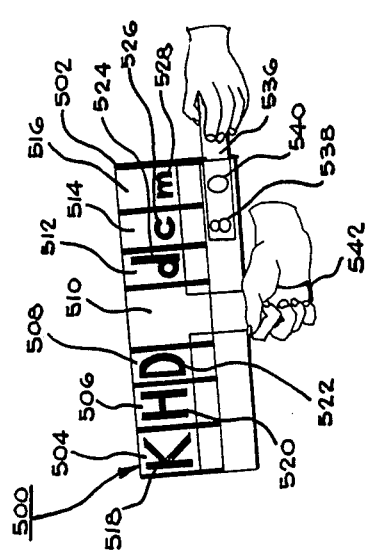
FIG. 15 is a perspective illustration of the final disclosed embodiment of the teaching aid constructed with the principles of the present invention.
Figure 17:
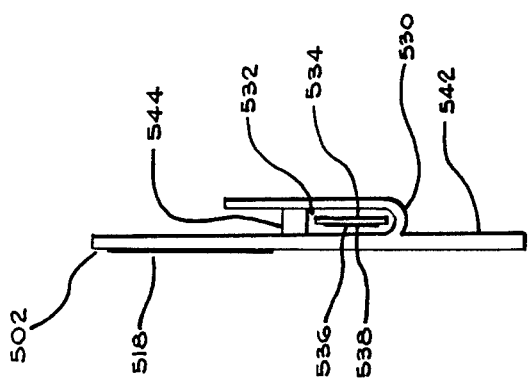
FIG. 17 is a sectional view of the teaching aid shown in FIGS. 15 and 16.

The fifth and final embodiment is illustrated in FIGS. 15, 16 and 17. System 500 employs a transparent plastic member 502 with seven digit zones 504, 506, 508, 510, 512, 514 and 516 spaced side by side. "G", "L" or "M" may be printed on the central zone 510 to represent grams, liters or meters. The left three zones 504, 506 and 508 are marked "K" 518, "H" 520 and "D" 522 for Kilo (1,000), Hecta (100) and Deca (10). The three right zones 512, 514 and 516 are marked "d" 524, "c" 526 and "m" 528 for deci (1/10), centi (1/100) and mili (1/1000). The main plastic member 502 is simply a transparent sheet with its bottom 530 upturned to form a channel 532 for the receipt of slidable strip 534 upon which a numeral 536 followed by zeroes 540 are written. A handle 542 extends downwardly from the center of the bottom edge. A plastic rod 544 is preferably provided in front of the upturned portion and the back of the main portion to more clearly define the channel 532 for receipt of the strip 534.

With the numeral eight 538 under the Hecta 520, a student may read the eight and following zeroes and determine that there are eighty Deca grams, liters or meters, eight-hundred units of measurement, eight-thousand deci's, eighty-thousand centi's or eight-hundred thousand mili's. This relationship is effected since the spacings between the letters on the main member 502 are equal to the spacings between numeral eight 538 and the following zeroes 540. With the eight 538 positioned under the "c" 526 a student may determine that there are eight centimeters or eighty millimeters. This embodiment could provide a useful visual aid in teaching the metric system.

As used herein, the various numerals including zeroes of the numbers throughout the various embodiments are considered to be mathematical indicia, markings representative of intelligent information. It should be further understood that the indicia markings could be printed, painted, drawn or formed by any technique to effect its intended function. Each embodiment thus constitutes a system with plural parts operable together for a common function to help both teachers and students. In like manner, the decimal points, dollar signs, positive and negative signs, the words "DECIMALS;" and "WHOLE NUMBERS", etc. are similarly considered to be mathematical indicia. As such, each of the parts of the various embodiments includes mathematical indicia, and with such parts being movable with respect to each other, the relationship of the parts and their indicia with respect to each other will present the viewing student with a different mathematical problem to be solved.

The various embodiments of the present invention may also be construed as being modality models in that they are devices with which the students may become directly involved through the handling and manipulating of ideas and in the setting up of problems among each other as well as with the teacher. The immediate responses by the students upon seeing the problem is also an improved educational technique since it requires present involvement rather than the more conventional technique of giving a test and then getting it corrected and reviewed at a much later date.

The above described invention could be very useful in the classroom in that it not only provides a convenient and inexpensive method of instruction for the teacher but that it could serve also to illustrate sometimes difficult concepts to slower students while, at the same time, serving to reinforce already mastered concepts to the brighter students.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:
1. A learning aid for use by a student in comprehending mathematical concepts comprising:
an opaque member formed to provide a channel and with the word "DECIMALS" and a first decimal point on one side and with the words "WHOLE NUMBERS" and a second decimal point on the other side; and
a strip of material with a plurality of numerals printed thereon receivable in the channel whereby the strip of material may be moved from one end of the opaque member to the other to demonstrate one of a plurality of whole numbers or to demonstrate one of a plurality of decimals as a function of the side of the opaque member read by the student and the position of the strip with respect to the opaque member.

2. The learning aid as set forth in claim 1 and further including a handle extending downwardly from one lower edge of the opaque member.

3. The learning aid as set forth in claim 1 wherein the first decimal point is near the lower right hand corner on the one side and the second decimal point is near the lower left hand corner of the other side.

4. An improved teaching aid comprising:
   a transparent member formed of two parallel plates coupled together adjacent to their upper and lower edges to define a channel therebetween;
   a strip having a plurality of numerals formed thereon, the strip being receivable in the channel; and
   a decimal point formed on a front lower portion of one of the plates whereby the strip may be moved one way or the other within the channel to demonstrate certain different whole or decimal numbers as a function of the location of the strip within the channel.

5. The teaching aid as set forth in claim 4 wherein the parallel plates are coupled together by small plastic spacer strips extending horizontally along the upper and lower edges of the parallel plates.

6. The teaching aid as set forth in claim 4 and further including an opaque rod with a loop in the upper end suspendable from the upper edge of the transparent member between preselected numerals of the strip for assisting in the teaching of rounding off of decimals or whole numbers.

7. For use by teachers in the teaching of mathematics, an improved device comprising:
   a large main plate having numerals thereon;
   medium side plates independently pivotable about adjacent vertical edges of the main and side plates to bring either a dollar sign or a decimal point on the side plates into view with the indicia of the main plate; and
   small bottom plates with decimal points independently pivotable about adjacent horizontal edges of the main and bottom plates to selectively bring the decimal points of the bottom plates into view with the indicia of the main plate.

8. The device as set forth in claim 7 wherein all the plates are opaque.

9. A device for use in teaching arithmetic to a student comprising:
   a pedestal formed of a rigid material shaped with a horizontal base portion and a vertical upstanding portion with the numeral "0" printed centrally with respect to the upstanding portion;
   two independently pivotable arms extending outwardly from the upstanding portion;
   negative numerals sequentially printed on one arm locatable to the left of the numeral "0";
   positive numerals sequentially printed on the other arm locatable to the right of the numeral "0";
   apertures extending through the arms and through the pedestal; and
   a pin positionable through the arms and pedestal whereby the arms may be extended outwardly or upwardly with preselected numerals on the arms being covered to illustrate certain conceptual principles of addition and subtraction.

10. The improved teaching aid as set forth in claim 9 wherein the pedestal is formed in an inverted "T"-shaped configuration.

11. An improved teaching aid comprising:
    a transparent member with a plurality of zones laterally located side by side;
    letters written in each zones representing units of measurement, the letters written in the three left zones including "K" and "H" and "D" indicative of the prefixes Kilo (1,000) and Hecta (100) and Deca (10), the letters written in the three right zones including "d" and "c" and "m" indicative of the prefixes deci (1/10) and centi (1/100) and mili (1/1000); and
    a strip with a written numeral followed by a series of zeros selectively positionable beneath the letters of the zones for teaching the relationship between numbers and units including parts and multiples thereof.

12. The teaching aid as set forth in claim 11 wherein the spacing between the zone of the transparent member is equal to the spacing between the numeral and zeroes of the strip.

13. The teaching aid as set forth in claim 12 and further including a central zone between the three left zones and three right zones of the transparent member.

* * * * *